(12) United States Patent
Hobson et al.

(10) Patent No.: US 6,370,259 B1
(45) Date of Patent: Apr. 9, 2002

(54) AUTOMATIC ADDRESS EXTRACTOR

(75) Inventors: Gregory Hobson, St. Charles County; R. Joe Stanley, Florissant, both of MO (US)

(73) Assignee: Engineered Support Systems, Inc., St. Louis, MO (US)

( * ) Notice: Subject to any disclaimer, the term of this patent is extended or adjusted under 35 U.S.C. 154(b) by 0 days.

(21) Appl. No.: 09/499,105

(22) Filed: Feb. 4, 2000

(51) Int. Cl.$^7$ ................................................. G06K 9/00
(52) U.S. Cl. ........................ 382/101; 707/505; 707/508
(58) Field of Search .................................. 382/100, 101, 382/176; 707/505, 507, 508; 283/70, 116

(56) References Cited

U.S. PATENT DOCUMENTS

| | | | |
|---|---|---|---|
| 5,325,303 A | * 6/1994 | Walz | 364/464.02 |
| 5,656,799 A | * 8/1997 | Ramsden et al. | 177/2 |
| 5,984,365 A | * 11/1999 | Petkovsek | 283/116 |

\* cited by examiner

*Primary Examiner*—Matthew C. Bella
(74) *Attorney, Agent, or Firm*—Polster, Lieder, Woodruff & Lucchesi, L.C.

(57) ABSTRACT

A method and apparatus (10) for preparing forms used by the Postal Service in delivering certain types of mail (E). Each piece of such mail is conveyed past a camera or scanner (12) to obtain an image of the piece including the name of the sender and name and address of the recipient. The image is processed by an image processor (14) to locate the edge (C) of the piece at its upper left hand corner where sender information is located. A first line of information, usually the sender's name, is extracted from a sender information segment (S) of the envelope, and the first two lines of recipient information, usually the recipient's name and street address, are extracted and from a recipient's information segment (R) of the mail piece. These three lines of information are now transferred from the memory onto an appropriate postal form (F) with each line of information copied onto an appropriate portion of the form. The forms are sorted by zip code and carrier route so a carrier can pick-up the forms needed together with the mail carried on their route.

30 Claims, 6 Drawing Sheets

V-775 250 016
UNITED STATES POSTAL SERVICE
RECEIPT FOR INSURED MAIL

SENT TO:

STREET & NO.

PO,STATE,& ZIP CODE

PS FORM 3813-P

U S INSURED MAIL

SENDER:
NAME
ADDRESS

PS FORM 3813-P

| UNITED STATES POSTAL SERVICE | DATE | SENDER'S NAME |
| SORRY WE MISSED YOU! | | |

PS FORM 3849

DELIVERY SECTION

| SIGNATURE | |
| PRINTED NAME | |
| DELIVERY ADDRESS | |

PS FORM 3849

| SENDER ADDRESS S | OTHER | POSTAGE |
| --- | --- | --- |
| OTHER | RECIPIENT ADDRESS R | OTHER |
| OTHER | OTHER | OTHER |

```
                V-775 250 016
        UNITED STATES POSTAL SERVICE
        RECEIPT FOR INSURED MAIL

SENT TO:      Joe Smith

STREET & NO.  250 Maple St.

PO, STATE, & ZIP CODE
```

U S INSURED MAIL

V-775 250 016

PS FORM 3813-P

FIG. 11

SENDER:
NAME    John Doe
ADDRESS

PS FORM 3813-P

AUTOMATIC ADDRESS EXTRACTOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to the processing of information on envelopes and similar pieces of mail, and more particularly, to a method of automatically extracting desired information from the piece of mail for use by a postal service in delivering the mail. The method and apparatus are also useful by other delivery services in delivering parcels of various types.

Special delivery pieces of mail, for example, express mail envelopes, certified or registered letters, insured packages, and the like all require the postal service to fill out a form in which specific information as to the source, addressee, contents, etc. is included. Currently, a postal employee must manually complete the form, taking the necessary information off of the piece of mail and copying it onto the form. This is not only a time consuming process, but is prone to mistakes being made. The simple fact someone chooses to use special delivery to send a piece of mail means the contents are valuable, time critical, or both. Accordingly, the time it takes to complete the form, and the accuracy in transcribing the information has a significant impact for both the sender and recipient, as well as the perceived competency of the postal service.

A process which not only speeds up the transfer of information from the piece of mail to the form but also increases the accuracy and completeness of the information transferred, increases the efficiency of the postal service and its perception as a provider of quality service by the public.

BRIEF SUMMARY OF THE INVENTION

Among the several objects of the present invention may be noted the provision of a process for acquiring specified information from a piece of mail and transferring the information to a form or receipt to be signed by the recipient;

the provision of such a process in which the piece of mail is scanned by a scanner programmed to extract the desired information from the piece or by a camera from which an image is obtained for processing;

the provision of such a process in which the scanner is further programmed to transfer the information onto the form;

the provision of such a process in which portions of the information to be included on the form are identifiable at different locations of the piece and those locations are selectively scanned to acquire the appropriate information;

the provision of such a process in which the information acquired by scanning the piece can be transferred to the form in either the same or a different order than that in which the information is obtained;

the provision of such a process in which each piece of mail is conveyed past the scanner, or camera so the desired information can be obtained from the piece;

the provision of such a process in which the extracted information can be sorted by zip code or street address, for example, so the form can be prepared in a manner conforming to a carrier's route;

the provision of such a process in which the scanned information includes hand written information which is printed or in cursive, as well as typed or electronically printed information;

the provision of such a process in which the materials scanned includes envelopes of various sizes and shapes, as well as parcels and packages of different sizes and shapes; and, the provision of such a process to improve the efficiency and accuracy in which the requisite information is obtained and transferred to an appropriate form or receipt which is required by the Postal Service for the delivery of specific types of mail.

In accordance with the invention, generally stated, a method and apparatus are provided for facilitating the preparation of forms required by the Postal Service for the delivery of particular pieces of mail. The process first involves conveying each piece of such mail past a camera or scanner to obtain an image of the piece including the name of the sender and name and address of the recipient. The image is then processed by an image processor to locate the edges of the piece at its upper left hand corner where sender information is usually located. The first line of information, typically the sender's name, is then extracted and stored in a memory. An address block for the recipient is next located. The first two lines of information, usually representing the recipient's name and street address, are now extracted and stored in the memory. The three stored lines of information are then transferred from the memory onto an appropriate postal form with each line of information copied onto an appropriate portion of the form. The forms may be sorted by zip code, street address and carrier route so each carrier can pick-up the forms he or she will need together with the mail they carry that day on their route. Other objects and features will be in part apparent and in part pointed out hereinafter.

BRIEF DESCRIPTION OF THE SEVERAL VIEWS OF THE DRAWINGS

In the drawings, FIGS. 1A–3 are representations of forms used by the United States Postal Service and which require name and address information of a recipient, FIGS. 1A and 1B respectively showing the front and sides of form 3813-P for the receipt of insured mail, and FIGS. 2A and 2B respectively showing the front and back sides of form 3849 for mail requiring a signature of the recipient for delivery, and FIG. 3 form 3800 for receipt of certified mail;

Corresponding reference characters indicate corresponding parts throughout the drawings.

DETAILED DESCRIPTION OF THE INVENTION

Figure 1A:
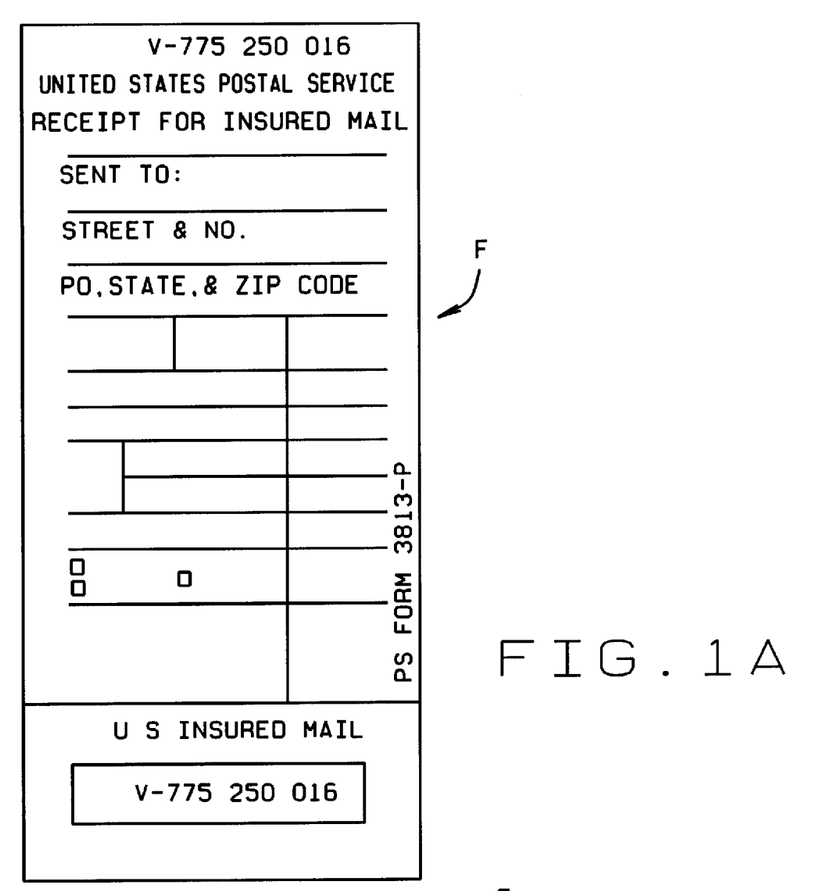
Figure 1B:
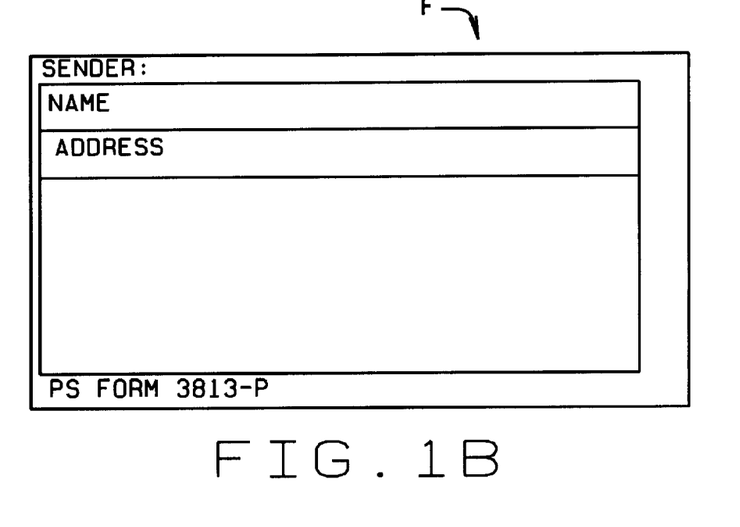
Figure 2A:
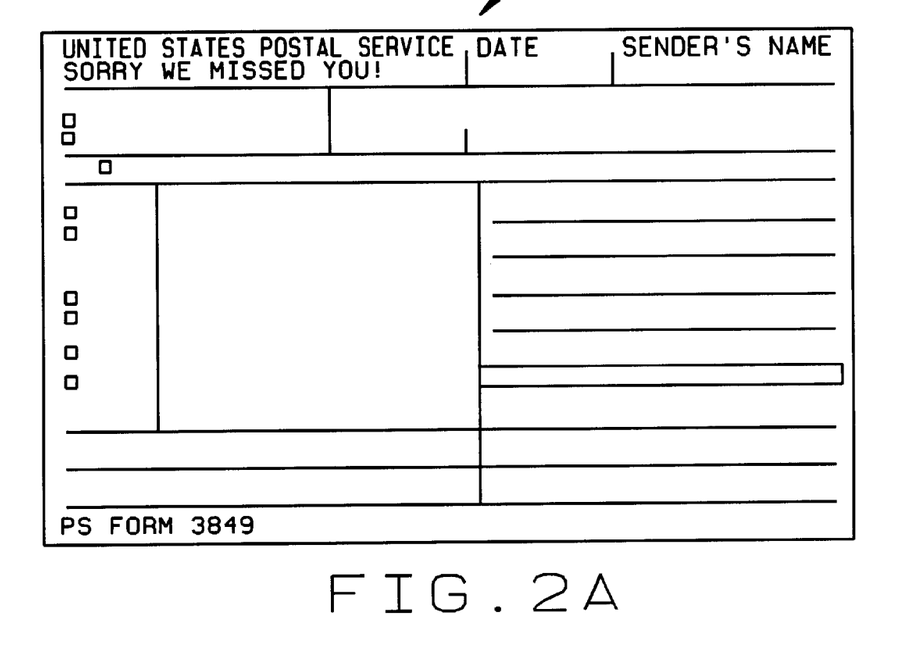
Figure 2B:
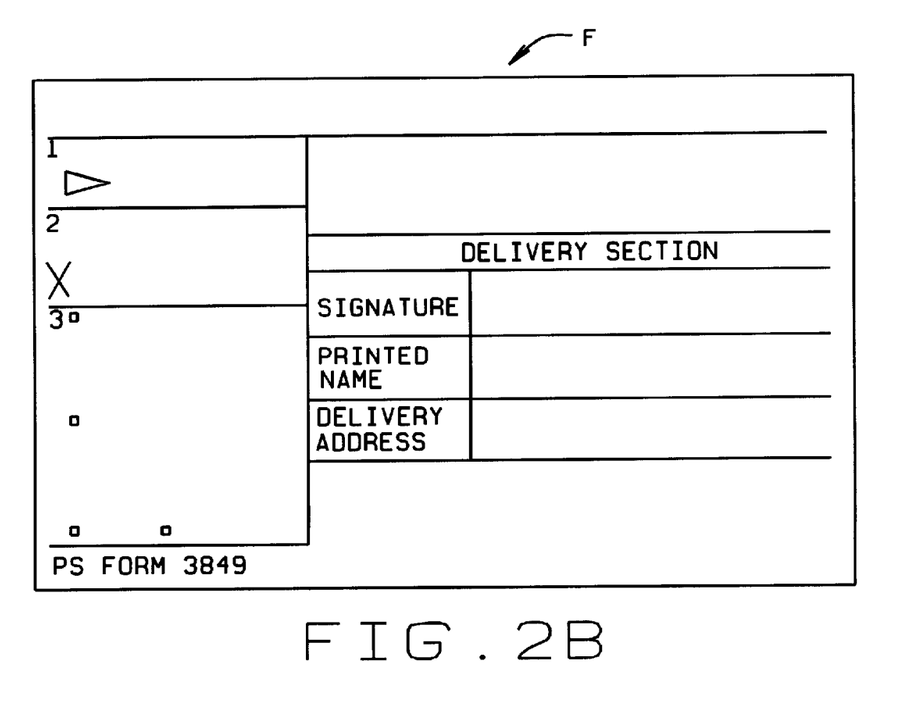
Figure 3:
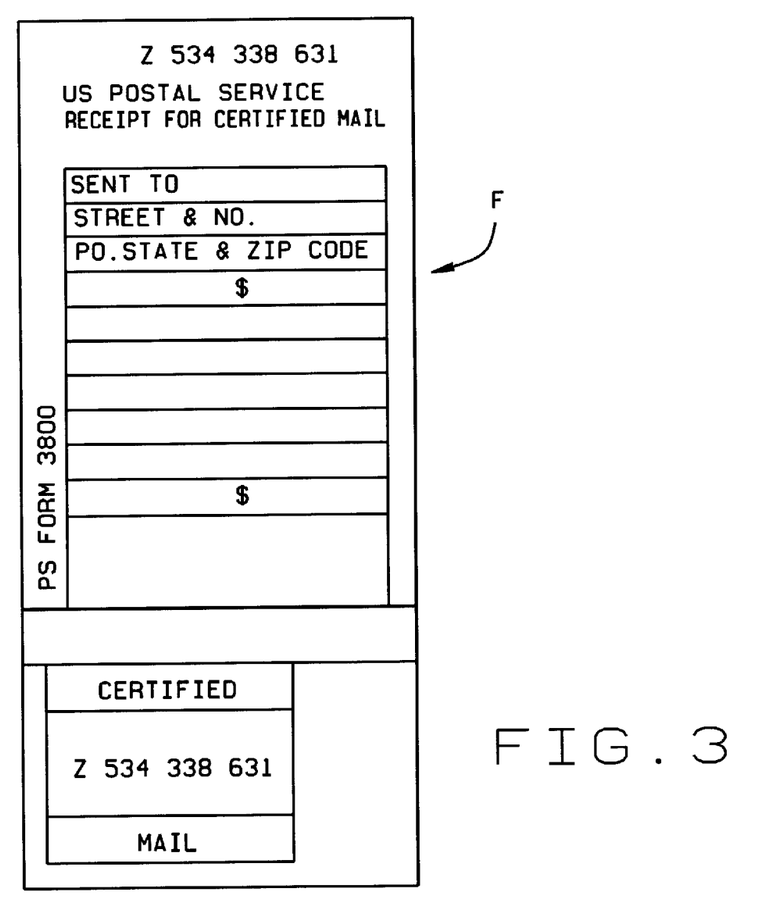

Referring to the drawings, apparatus and a method of the present invention is for use in extracting information from an envelope E or label L attached to a box or package K, and for using this information in filling out forms F used by the United States postal service or other delivery services. Referring to FIGS. 1A–3, FIGS. 1A–1B represent United States Postal Service (USPS) form 3813-P which must be completed when insured mail is delivered to a recipient. FIGS. 2A–2B represent USPS form 3849 used as a receipt or reminder for mail delivery. FIG. 3 represents USPS form 3800 which is used for delivery of certified mail. In each instance, when a postal carrier delivers a piece of mail which falls into one of the categories with which the forms are associated, certain information must be completed. In particular, information about the sender and recipient must be filled in on the form. As previously discussed, carriers have heretofore had to manually complete these forms before leaving on their routes. In accordance with the present invention, this process is now automated, saving the carrier time, and reducing mistakes.

Figure 8:
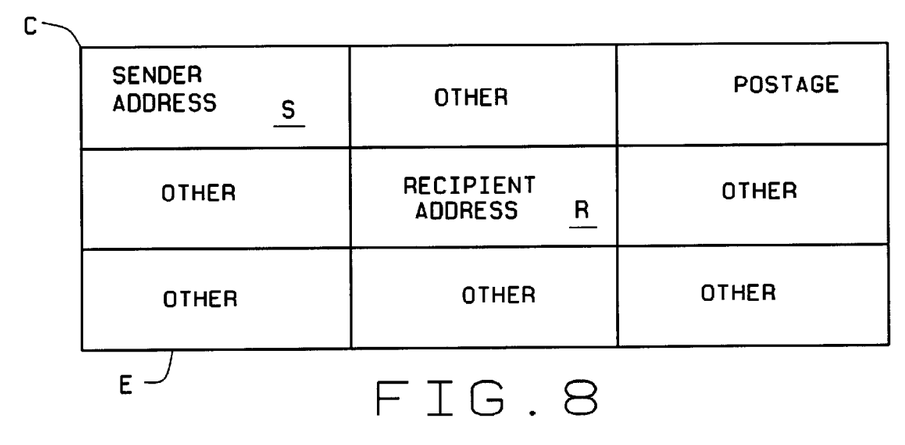
FIG. 8 illustrates the front of an envelope or label and where thereon sender and recipient information is typically found.
Figure 10:
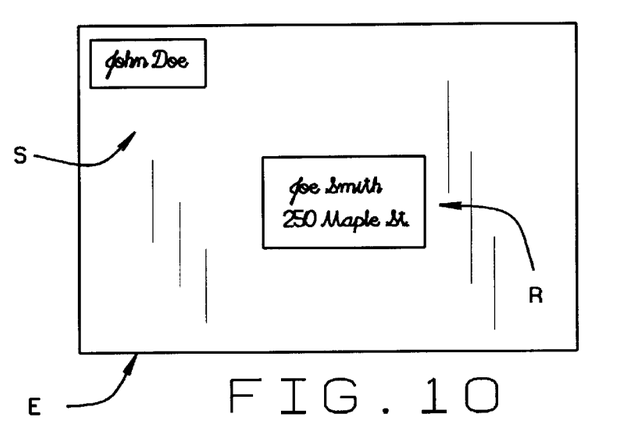
FIG. 10 similarly illustrates the sender and recipient information obtained from the envelope of FIG. 5; and, FIG. 11 illustrates a completed form with sender and recipient information printed onto the form in the same form in which the information appears on the envelope.

Mail is sorted. It is sorted not only by the zip code of the recipient, but also as to the type of mail; insured, certified, etc. Mail also comes in various guises. Most mail is in the form of either envelopes E or flat pieces in which the names and addresses of the sender S and recipient R or inscribed on the front of the piece as shown in FIG. 8, or in the form of packages K to which a label L is attached. The label also includes the sender's and recipient's names and addresses. Referring to FIG. 10, it is conventional that certain information is placed on an envelope E, for example, in a particular format. As shown, postage P is usually placed in the upper right hand corner. Information S about a sender is usually placed in the upper left hand corner, and recipient information R in the center portion of the envelope. Although not shown, it will be understood that sender and recipient information included on a label is also usually in a prescribed format.

Figure 4:
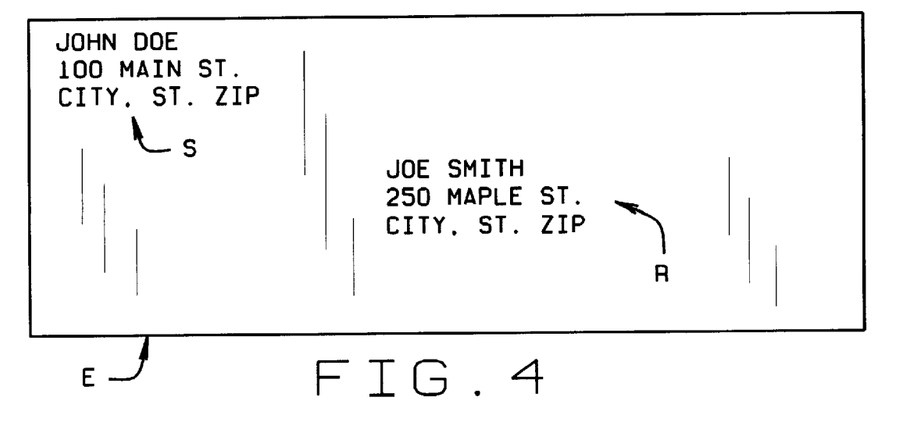
FIGS. 4 and 5 represent envelopes with senders' and recipients' names and addresses, some names and addresses being handwritten, and others being printed or written in cursive.
Figure 5:
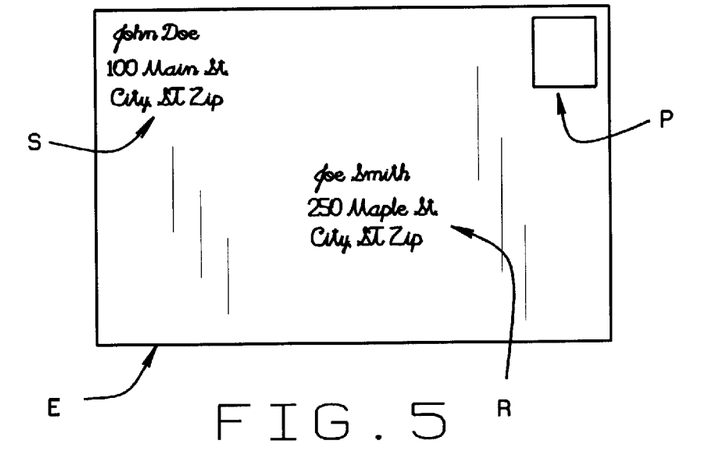
Figure 6:
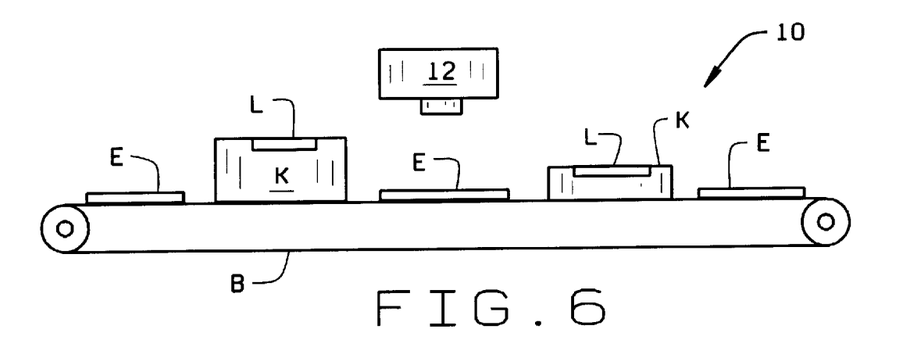
FIG. 6 is a simplified representation of one portion of the apparatus of the present invention.

Envelopes E and packages K are placed on a conveyor belt B which conveys the pieces from one station S1 to another station S2. Apparatus 10 of the present invention includes a camera, scanner, or other imaging device 12 which is positioned above the conveyor belt. Mail pieces are placed on the conveyor belt with address information visible to the camera. As each mail piece passes beneath scanner 12, an image of the envelope or label is obtained by the camera and transmitted to a processor 14. It will be understood that the sender and recipient information S and R can appear in a variety of ways. In FIG. 4, for example, both the sender and recipient information appear in a block form which is produced by a typewriter or word processor. In FIG. 5, this information is produced in cursive as when the sender writes this information on the envelope or label. It will be further understood that there are a variety of combinations of the forms shown in this two figures. Importantly, processor 14 does not attempt to recognize or interpret the information on the face of the envelope or label. That is, the processor's function is locate those areas on an envelope or label where the pertinent sender and recipient information is located, so pertinent portions of that information can be reproduced on the appropriate form F.

Typically, address information, whether the sender's or the recipient's includes a plurality of vertically arranged, horizontally extending lines in a first line of which the sender or recipient's name appears. The sender or recipient's street address is then set out in a second line which appears beneath the first line. The city, state, and zip code then appear in a third line beneath the first two; although, the zip code may sometimes be set out in a fourth line below the first three. For purposes of the present invention, processor 14 looks for the first line of the sender information S, and the first two lines of the recipient information. For purposes of completing a form F, it is only necessary that the sender's name be known. Also, since the mail is sorted by zip code prior to being placed on conveyor belt B, obtaining the zip code information is unnecessary.

After scanner 12 has an image of a mail piece, the image is transmitted to processor 14. The processor processes the image to first locate the upper left hand corner C of the envelope. Once this is done, the processor can then place all the information contained in the image into an appropriate image framework. As shown in FIG. 8, the envelope can be divided into segments in which selected information should appear. Thus, the processor will treat the information in the upper left hand corner of the image as sender information S, information in the upper right corner as postage, and information in the middle portion of the image as recipient information R. Occasionally, information may appear on those portions of the envelope marked "OTHER" in FIG. 8. If the processor recognizes the sender and recipient information in their anticipated locations on the face of envelope E, the processor will recognize but disregard the information appearing in these other areas.

Figure 9:
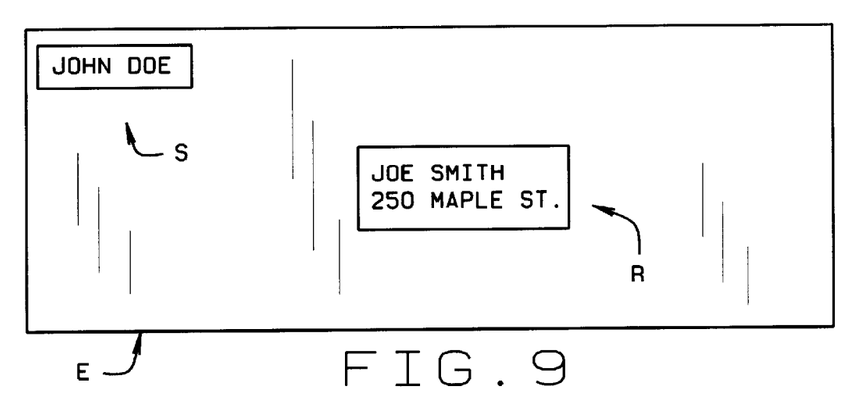
FIG. 9 illustrates sender and recipient information obtained from the envelope of FIG. 4 and used to complete one of the forms shown in FIGS. 1–3.
Figure 11:
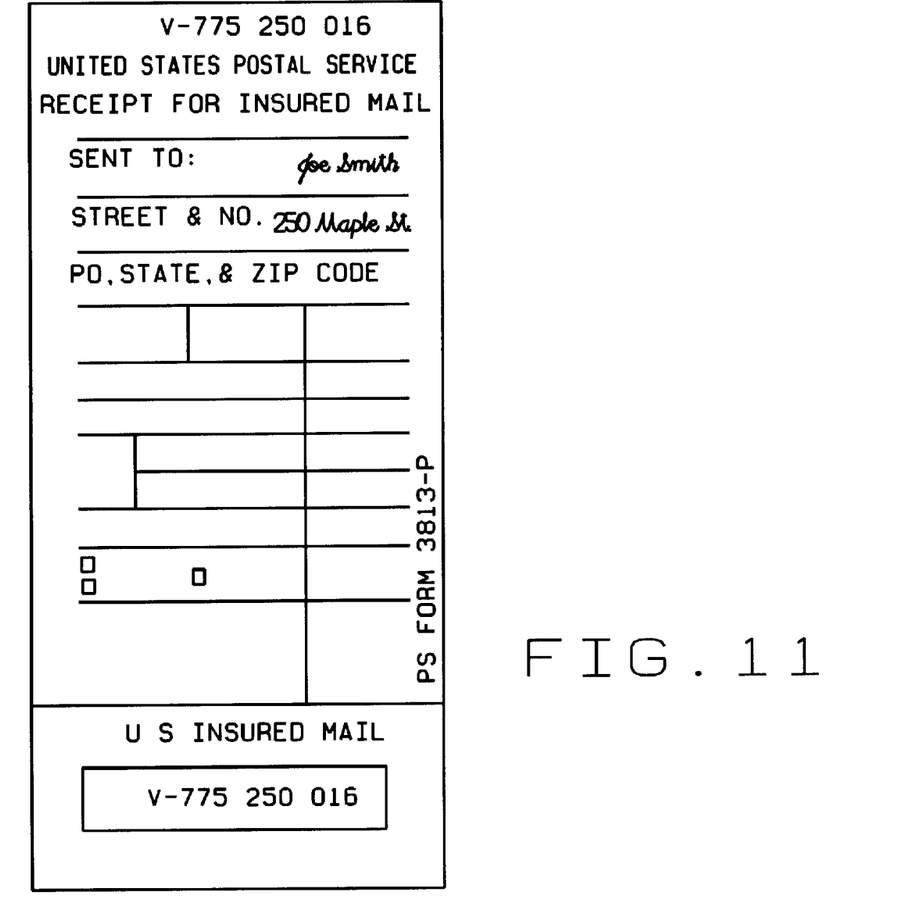

As shown in FIGS. 9 and 10, processor 14, once it has identified the relevant sender and recipient information blocks, treats the remainder of the envelope image as extraneous. The processor now copies the first line of information in the sender S information block and transfers the copied information to a form printer 16 in which the respective forms F shown in FIGS. 1A–3 are queued. The form printer then prints the copied information into the correct location on the form. For example, Sender, Name is the first line on the back of form 3813-P; so, the copied information is printed on this line. Next, the processor copies the first line of information in the recipient R block and prints this information on the Sent To line at the top of the front page of the form. Finally, the processor copies the second, street address line in the recipient information block and transfers this information to the Street & No. line on the front page of the form. A completed form is shown in FIG. 11. If the forms are batch printed, they can then be sorted by a sorter 17 so all the forms needed by each carrier are individually available to the carrier.

Figure 7:
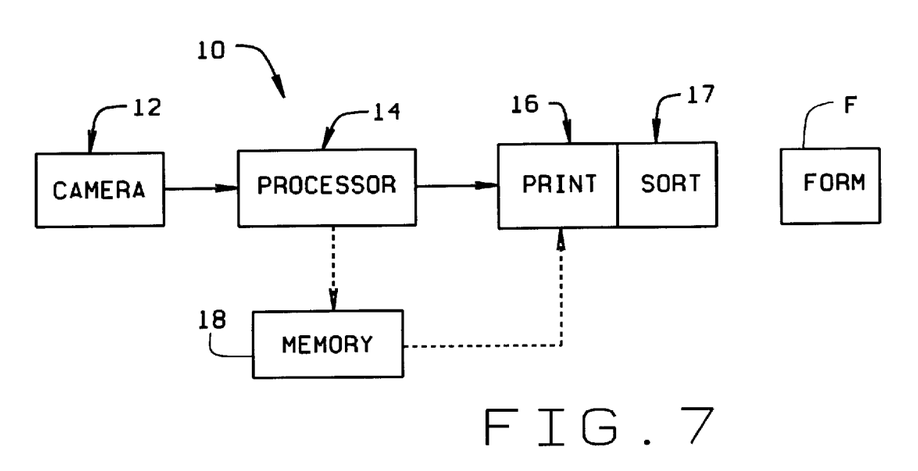
FIG. 7 is another simplified representation of the apparatus of the present invention.

Those skilled in the art will recognize that it is immaterial as to the sequence in which the three lines of copied information are printed onto the form. Further, rather than printing a form each time an envelope is viewed by camera 12, the information can be stored in a memory 18 until all of the envelopes and packages have been scanned. The information is then transferred from the memory to the printer and the forms are prepared. This latter embodiment is indicated by the dashed line configuration in FIG. 7.

Regardless of which method is used to print the forms, once the forms are completed, the mail carrier can pick-up the forms together with the mail for delivery along the mail route. In addition, if the carrier has a preferred route he or she takes to cover their route, processor 12 can be programmed with that information. Then, as the envelopes or parcels are scanned, the information obtained can first be sorted in accordance with the route information, so the forms F can be printed in the same sequence as the route is covered. The carrier is thus saved an additional step of having to sort the printed forms before beginning the route.

What has been described is a process for acquiring specified information from a piece of mail. The mail piece can be an envelope or package and different sizes and shapes of each are accommodated by the process. Each piece is scanned by a scanner or camera programmed to extract desired information from the piece for transfer information onto an appropriate form. The requisite information can be found on different portions of the piece and the acquired information can be transferred to the form in both a different order and a different format than that in which it is included on the piece. The process allows the extracted information to be sorted, for example, by zip code or street address. The process allows information to be extracted whether found in hand written form, or in a typed or printed format. Use of the process improves the efficiency and accuracy in which the requisite information is obtained and used to complete an appropriate form. A separate form can be printed each time an envelope or package is viewed or scanned, or the pertinent information from each envelope is stored in a memory and the forms are batch run after all the parcels have been viewed.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus facilitating the preparation of forms required by the Postal Service for the delivery of particular pieces of mail including registered mail and certified mail comprising:

a conveyor on which each piece of mail is placed for conveyance from one location to another;

imaging means obtaining an image of the mail piece as it is being conveyed, the image including information about the sender and the recipient of the piece of mail;

an image processor processing said image to locate said sender and recipient information and to extract at least a portion of the sender and recipient information from the image; and, means printing a postal form required for use with the piece of mail for its delivery, said sender and recipient information being transferred to said form from said image processor whereby said form is prepared for a mail carrier's use in delivering the piece of mail so to save the carrier time by preparing the forms for the carrier.

2. The apparatus of claim 1 further including a sorter for sorting the forms so each carrier can pick-up the forms needed for his or her particular route together with the mail to be carried on the route.

3. The apparatus of claim 2 wherein said processing means organizes the information printed on said forms in the sequence in which the carrier covers the mail delivery route.

4. The apparatus of claim 1 further including a memory in which said sender and recipient information is stored, said information being transferred to said printing means when said form is being prepared.

5. The apparatus of claim 1 wherein said processor processes said image to locate the edges of said piece.

6. The apparatus of claim 5 wherein said processor locates the edges of said piece forming an upper left hand corner of the piece, said upper left hand corner including said sender information.

7. The apparatus of claim 6 wherein said sender information includes a plurality of vertically arranged, horizontally extending lines of sender information and said processor extracts the first line of information, representing the sender's name, from said image.

8. The apparatus of claim 7 wherein said processor further locates a center of said piece, said center including recipient information.

9. The apparatus of claim 8 wherein said recipient information includes a plurality of vertically arranged, horizontally extending lines of recipient information and said processor extracts the first and second lines of information, representing the recipient's name and street address, from said image.

10. The apparatus of claim 9 wherein said sender and recipient information is transferred to said form in the identical format in which it appears on said piece.

11. The apparatus of claim 5 wherein said processor identifies all information inscribed on said piece including information other than that relating to the sender and recipient.

12. The apparatus of claim 11 wherein said processor identifies the locations on said piece where any information appears.

13. The apparatus of claim 12 wherein said processor evaluates those locations where information appears against a reference as to where sender and recipient information appears to determine where to obtain said sender and recipient information.

14. The apparatus of claim 1 for use with flat pieces of mail including envelopes.

15. The apparatus of claim 14 further for use with packages such as boxes and the like on which a label is appended.

16. Apparatus for preparing forms required for the delivery of certain types of mail including registered mail and certified mail comprising:

imaging means obtaining an image of a piece of mail including information about the sender and the recipient of said piece;

an image processor processing said image to locate said sender and recipient information and extract a portion of the sender and recipient information from the image; and, means printing said postal form required for use in delivering said piece of mail including transferring said sender and recipient information to said form in the identical format in which it appears on said piece whereby said form is prepared for a mail carrier's use in delivering the piece of mail so to save the carrier time in not having to prepare the form.

17. A method of preparing postal service forms required for the delivery of particular pieces of mail including registered mail and certified mail comprising:

obtaining an image of a piece of mail including information about the sender and recipient of the piece;

processing said image including locating said sender and recipient information on the piece and extracting at least a portion of the sender and recipient information from the image; and, printing a postal form required for use in delivering said piece of mail including transferring said sender and recipient information thereto whereby said form is prepared for a mail carrier's use in delivering the piece of mail so to save the carrier time in not having to prepare the form him or herself.

18. The method of claim 17 further including placing pieces of mail on a conveyance and conveying said pieces from one location to another, and obtaining said image while said piece is being conveyed.

19. The method of claim 17 wherein printing said postal form includes copying said sender and recipient information to said form in the identical format in which it appears on said piece.

20. The method of claim 17 wherein processing said image includes locating the edges of said piece.

21. The method of claim 20 wherein said processing includes locating the edges of said piece forming an upper left hand corner of the piece, said upper left hand corner including sender information.

22. The method of claim 21 wherein said sender information includes a plurality of vertically arranged, horizontally extending lines of sender information and processing said image includes extracting the first line of information, representing the sender's name, from said image.

23. The method of claim 22 wherein processing said image further includes locating a center of said piece, said center including recipient information.

24. The method of claim 23 wherein said recipient information includes a plurality of vertically arranged, horizontally extending lines of recipient information and processing said image includes extracting the first and second lines of information, representing the recipient's name and street address, from said image.

25. The method of claim 20 wherein processing said image includes identifying all information inscribed on said piece including information other than that relating to the sender and recipient.

26. The method of claim 25 wherein processing said image includes identifying locations on said piece where any information appears, and evaluating those locations against a reference as to where sender and recipient information typically appears to determine where to obtain said sender and recipient information.

27. The method of claim 17 further including storing sender and recipient information for a plurality of pieces in a memory and sequentially transferring said information to said form.

28. The method of claim 27 further including sorting said information by zip code, street, or carrier route so to print said forms in a desired sequence.

29. The method of claim 28 for use with flat pieces of mail including envelopes.

30. The method of claim 29 for further use with packages including boxes on which a label is appended.

* * * * *